United States Patent
Lee et al.

(10) Patent No.: US 10,627,938 B2
(45) Date of Patent: Apr. 21, 2020

(54) TOUCH SCREEN DEVICE WITH INTEGRATED FINGERPRINT SENSOR AND METHOD OF DRIVING OF THE SAME

(71) Applicant: LG Display Co., Ltd., Seoul (KR)

(72) Inventors: Junghoon Lee, Incheon (KR); Kyoseop Choo, Suwon-si (KR); Jiho Cho, Seoul (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/791,747

(22) Filed: Oct. 24, 2017

(65) Prior Publication Data
US 2018/0113548 A1 Apr. 26, 2018

(30) Foreign Application Priority Data
Oct. 24, 2016 (KR) .................. 10-2016-0138708

(51) Int. Cl.
*G06F 3/044* (2006.01)
*G06F 3/041* (2006.01)
*G06K 9/00* (2006.01)

(52) U.S. Cl.
CPC ............ *G06F 3/0412* (2013.01); *G06F 3/044* (2013.01); *G06F 3/0416* (2013.01); *G06K 9/0002* (2013.01); *G06F 2203/04106* (2013.01); *G06F 2203/04112* (2013.01); *G06K 9/0008* (2013.01); *G09G 2310/0264* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 8,564,314 B2 | 10/2013 | Shaikh et al. | |
| 10,338,731 B2 * | 7/2019 | Song | G06K 9/0002 |
| 10,379,684 B2 * | 8/2019 | Ahn | G06F 3/044 |
| 10,395,086 B2 * | 8/2019 | Lee | G06F 21/32 |
| 10,467,449 B2 * | 11/2019 | Jang | G06F 3/044 |
| 10,481,741 B2 * | 11/2019 | Han | G06F 3/04886 |
| 2012/0105081 A1 * | 5/2012 | Shaikh | G06K 9/0002 |
| | | | 324/686 |
| 2012/0242588 A1 * | 9/2012 | Myers | G06F 1/1637 |
| | | | 345/173 |
| 2012/0243151 A1 * | 9/2012 | Lynch | H04M 1/0202 |
| | | | 361/679.01 |
| 2012/0243719 A1 * | 9/2012 | Franklin | G06F 1/1652 |
| | | | 381/333 |
| 2013/0307818 A1 * | 11/2013 | Pope | G06F 3/044 |
| | | | 345/174 |
| 2016/0042215 A1 * | 2/2016 | Wang | G06K 9/00087 |
| | | | 382/124 |
| 2017/0220182 A1 * | 8/2017 | Schwartz | G06F 3/0416 |

FOREIGN PATENT DOCUMENTS

KR 10-1432988 B1 8/2014

* cited by examiner

*Primary Examiner* — Olga V Merkoulova
(74) *Attorney, Agent, or Firm* — Polsinelli PC

(57) ABSTRACT

A touch screen device with an integrated fingerprint sensor comprises: a touch screen having a fingerprint recognition area with fingerprint sensors and a touch recognition area with touch sensors physically separated from the fingerprint sensors; and a touch IC that drives the touch sensors and the fingerprint sensors in fingerprint sensing mode to sense fingerprint recognition information from the fingerprint sensors and touch recognition information from the touch sensors.

20 Claims, 11 Drawing Sheets

TOUCH SCREEN DEVICE WITH INTEGRATED FINGERPRINT SENSOR AND METHOD OF DRIVING OF THE SAME

CROSS-REFERENCE TO RELATED APPLICATION

This application claims the benefit of Korean Patent Application No. 10-2016-0138708 filed on Oct. 24, 2016, which is incorporated herein by reference in its entirety for all purposes as if fully set forth herein.

BACKGROUND

Field of the Disclosure

The present disclosure relates to a display device, and more particularly, to a touch screen device with an integrated fingerprint sensor and a method of driving the same.

Discussion of the Background

With the advance of computer technology, computer-based systems for various purposes, such as laptop computers, tablet PCs, smartphones, personal digital assistants, automated teller machines, search guidance systems, etc., have been developed. These systems usually store a lot of confidential data such as business information or trade secrets, as well as personal information about the private lives of individuals. Therefore, there is a need to strengthen security to protect such data.

To this end, fingerprint sensors have been conventionally used which can strengthen security by registering or authenticating with a system via fingerprint.

A fingerprint sensor is a sensor that detects a human fingerprint. Fingerprint sensors are broadly categorized into optical fingerprint sensors and capacitive fingerprint sensors.

An optical fingerprint sensor internally illuminates a fingerprint using a light source such as LED (light-emitting diode) and detects light reflected by the ridges of the fingerprint by a CMOS image sensor. The optical fingerprint sensor is limited in terms of size reduction since it involves scanning using an LED, and its manufacturing cost tends to be high because the light source is expensive.

The capacitive fingerprint sensor uses the difference in electric charge between ridges and valleys touching the fingerprint sensor.

A known example of the related art capacitive fingerprint sensor is U.S. Patent Application No. US 2013/0307818 filed on Nov. 21, 2013, entitled "Capacitive Sensor Packaging". The capacitive fingerprint sensor disclosed in this U.S. patent application is an assembly with a particular push button attached thereon, and comprises a silicon wafer, imprinted with a circuit for measuring the capacitance between a capacitive plate and a user's fingerprint (including the ridges and valleys).

In general, the ridges and valleys of a human fingerprint are very thin, ranging from 300 µm to 500 µm. Thus, the capacitive fingerprint sensor disclosed in the above U.S. patent application requires the manufacture of a high-resolution sensor array and an IC (integrated circuit) for fingerprint recognition, and uses a silicon wafer onto which the sensor array and the IC can be integrated together. However, integrating the high-resolution sensor array and the IC together using the silicon wafer requires an assembly structure for attaching the push button and the fingerprint sensor together. This makes the configuration complicated and increases the size of a non-display area, a.k.a., bezel. Moreover, the push button (e.g., the home key on a smartphone) doubles as a fingerprint sensor, which leads to an increase in thickness and makes the fingerprint sensing area dependent on the size of the push button.

To solve these problems, technologies have been developed, such as the technology of using part of a touch sensor screen as a fingerprint identification area. Examples of this technology include U.S. Pat. No. 8,564,314 filed on Oct. 22, 2013, entitled "Capacitive touch sensor for identifying a fingerprint)" and Korean Patent Registration No. 10-1432988 filed on Aug. 18, 2014, entitled "Capacitive touch screen with integrated fingerprint recognition".

FIG. 1 schematically shows the arrangement of driving electrodes and sensing electrodes on a capacitive sensing panel, which is illustrated in the above identified U.S. patent. FIG. 2 shows the configuration of a capacitive touch screen with integrated fingerprint recognition, which is illustrated in the above identified Korean Patent Registration.

Referring to FIG. 1, the capacitive touch sensor for identifying a fingerprint comprises a touch sensor 3 comprising a touch driving electrode $1(x)$ and a touch sensing electrode $1(y)$, and a fingerprint sensor 5 comprising a fingerprint driving electrode $5(x)$ and a fingerprint sensing electrode $5(y)$. In this capacitive touch sensor for identifying a fingerprint, a dedicated fingerprint sensor 5 is placed in a part of the screen area, so touch does not work on the area of the fingerprint sensor 5 and the touch performance is low in the area around the fingerprint sensor 5.

Referring to FIG. 2, the capacitive touch screen with integrated fingerprint recognition comprises a touch panel AA, a plurality of electrode connecting lines BB, and a touch controller CC. In this configuration, the touch panel AA has tiny channels A3 formed by a combination of first channel electrodes A1 (either Tx or Rx) and second channel electrodes A2 (the remaining ones Tx or Rx) arranged to intersect each other. The tiny channels A3, except for those in the area of a fingerprint recognition sensor A4, are grouped together in numbers and function as touch group channels A5 for touch signal detection, and the tiny channels A3 corresponding to the area of the fingerprint recognition sensor A4 function as fingerprint recognition channels A6.

However, the related art capacitive touch screen with integrated fingerprint recognition does not allow touch operation when driving the fingerprint recognition area in fingerprint sensing mode, which is a huge inconvenience in terms of products. For example, the related art capacitive touch screen with integrated fingerprint recognition allows the user to choose a password, pattern, or fingerprint to initially unlock the lock screen. In this case, the fingerprint sensor and the touch sensor cannot be driven simultaneously. Moreover, in the related art capacitive touch screen with integrated fingerprint recognition, the user cannot perform a touch gesture to turn off the activated fingerprint recognition feature.

SUMMARY

Accordingly, the present disclosure has been made in an effort to provide a touch screen device with an integrated fingerprint sensor that has fingerprint sensors within a touch screen and allows touch operation in fingerprint sensing mode in areas other than a fingerprint recognition area within the touch screen, and a method of driving the same.

An exemplary aspect of the present disclosure provides a touch screen device with an integrated fingerprint sensor, the touch screen device comprising: a touch screen having a fingerprint recognition area with fingerprint sensors and a touch recognition area with touch sensors physically separated from the fingerprint sensors; and a touch IC that drives the touch sensors and the fingerprint sensors in fingerprint sensing mode to sense fingerprint recognition information from the fingerprint sensors and touch recognition information from the touch sensors.

In the fingerprint sensing mode, the touch IC allocates touch intervals for driving the touch sensors to perform sensing and fingerprint intervals for driving the fingerprint sensors to perform sensing, within one cycle of a touch-fingerprint synchronization signal.

In the fingerprint sensing mode, during the touch intervals, the touch IC supplies a sensor driving signal to Tx electrodes in the touch recognition area and senses touch recognition information from Rx electrodes in the touch recognition area, and during the fingerprint intervals, the touch IC supplies a sensor driving signal to Tx electrodes in the fingerprint recognition area and senses touch recognition information from Rx electrodes in the fingerprint recognition area.

Tx electrodes are formed in a high-density pattern in the fingerprint recognition area and the areas to the left and right of the fingerprint recognition area, and the Tx electrodes, which are formed in the high-density pattern in the areas to the left and right of the fingerprint recognition area, are grouped together in numbers and the Tx electrodes in the same group are driven simultaneously, in order for the touch IC to use the areas to the left and right of the fingerprint recognition area as the touch recognition area.

In touch sensing mode, the touch IC repetitively drives only the touch sensors in the touch recognition area to perform sensing.

A ground pattern is inserted between the fingerprint recognition area and the touch recognition area in order to minimize signal interference.

Another exemplary aspect of the present disclosure provides a method of driving a touch screen device with an integrated fingerprint sensor, the touch screen device comprising a touch screen having a fingerprint recognition area with fingerprint sensors and a touch recognition area with touch sensors physically separated from the fingerprint sensors, wherein the touch sensors and the fingerprint sensors are driven in fingerprint sensing mode to sense fingerprint recognition information from the fingerprint sensors and touch recognition information from the touch sensors.

A further exemplary aspect of present disclosure provides a display device having a display panel displaying an image, including a touch screen overlapping an image display area on the display panel and having a fingerprint recognition area and a touch recognition area, wherein the fingerprint recognition area has fingerprint sensors and the touch recognition area has touch sensors separated from the fingerprint sensors; and a touch IC driving the touch sensors and the fingerprint sensors in a time-division manner in a fingerprint sensing mode, so that both the touch sensors and the fingerprint sensors obtain sense fingerprint recognition information from the fingerprint sensors and touch recognition information from the touch sensor in the fingerprint sensing mode.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain the principles of the disclosure.

In the drawings.

DETAILED DESCRIPTION

Figure 1:
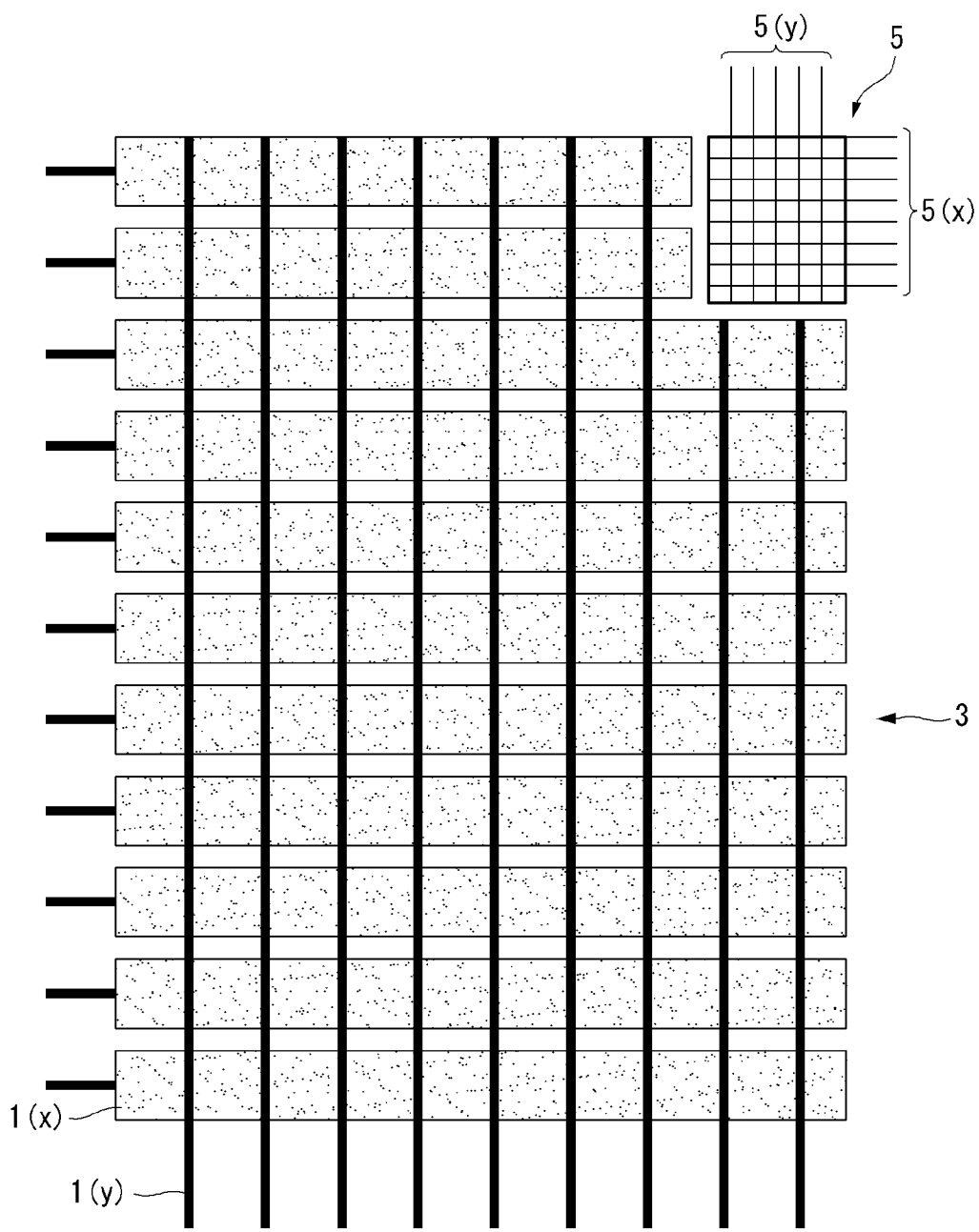
FIG. 1 is a plan view schematically showing the arrangement of driving electrodes and sensing electrodes on a capacitive sensing panel according to the related art.
Figure 2:
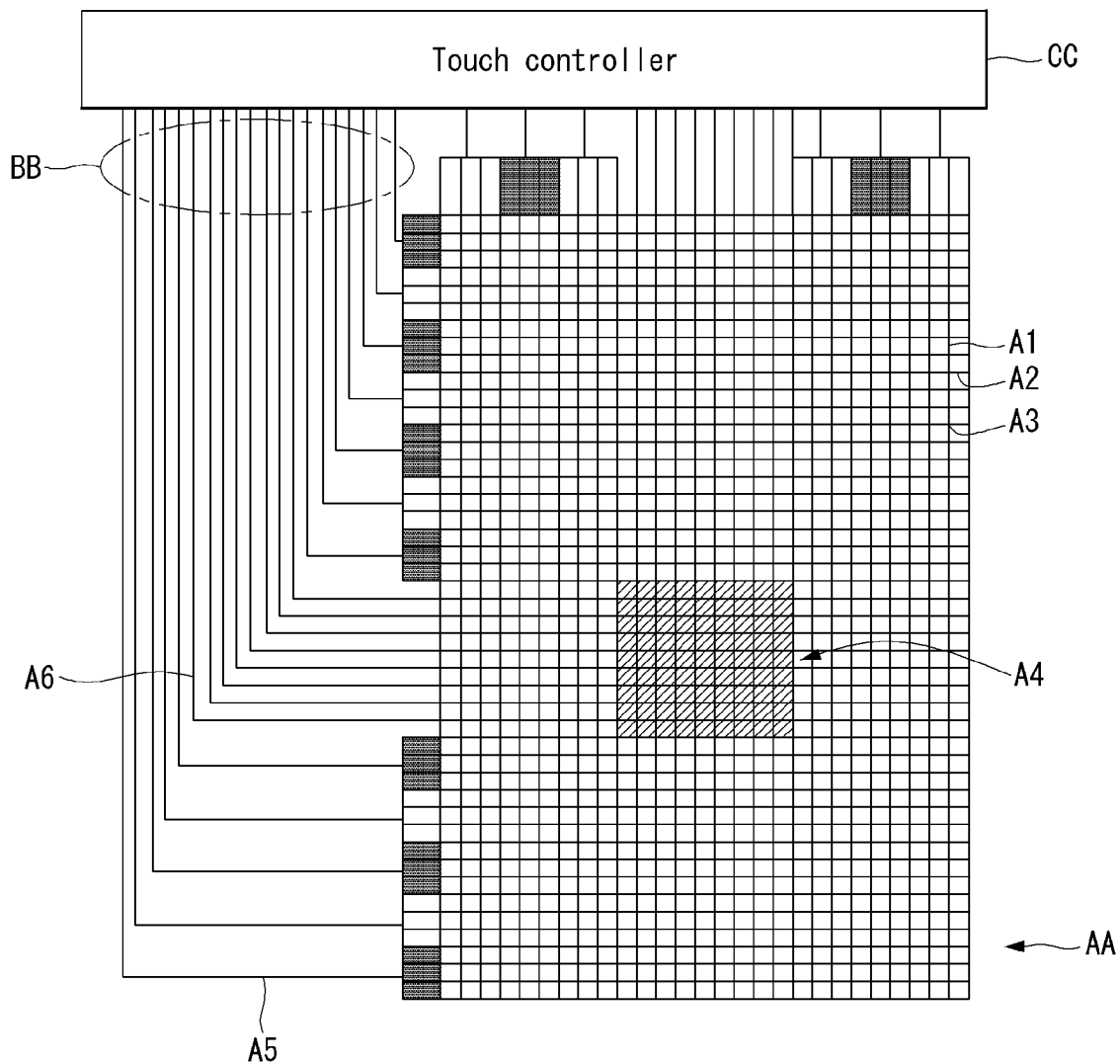
FIG. 2 is a view showing the configuration of another capacitive touch screen with integrated fingerprint recognition according to the related art.

A display device to which a touch screen device with an integrated fingerprint sensor according to the present disclosure is applied may be implemented based on flat panel displays such as a liquid crystal display (LCD), a field emission display (FED), a plasma display panel (PDP), an organic light-emitting display (OLED), an electrophoresis display (EPD), etc. It should be noted that, although the following aspects will be described with respect to a liquid crystal display as an example of the flat panel displays, the display device of this disclosure is not limited to the liquid crystal display.

Hereinafter, exemplary aspects of the present disclosure will be described with reference to the attached drawings. Throughout the specification, the same reference numerals indicate substantially the same components. When it is deemed that a detailed description of well-known functions or configurations related to the present disclosure may unnecessarily obscure the subject matter of the present disclosure, the detailed description will be omitted.

Figure 3:
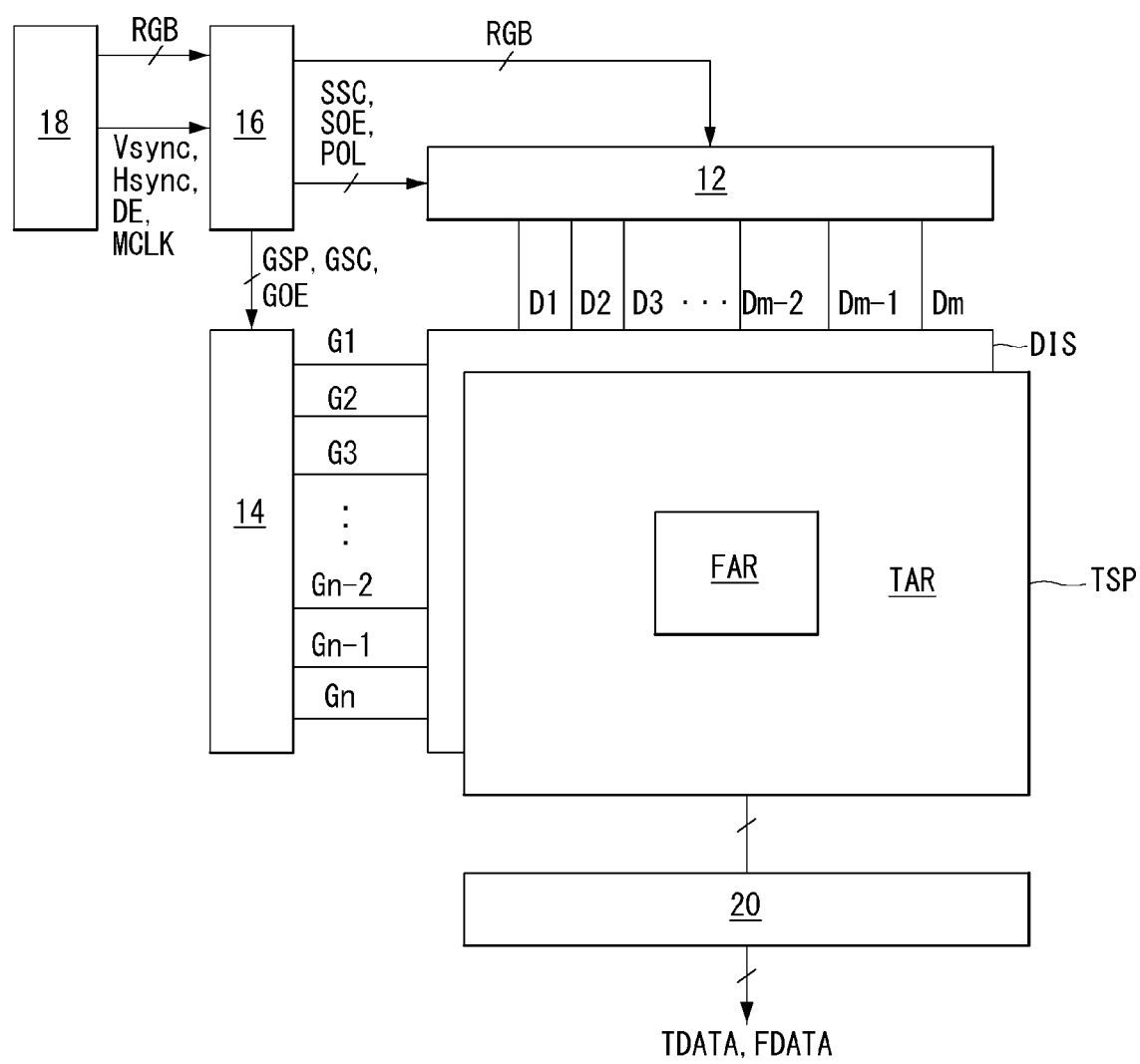
FIG. 3 is a block diagram showing a display device to which a touch screen device with an integrated fingerprint sensor according to an aspect of the present disclosure.

FIG. 3 shows a display device to which a touch screen device with an integrated fingerprint sensor according to an aspect of the present.

Referring to FIG. 3, the touch screen device with an integrated fingerprint sensor according to the present disclosure comprises a touch screen TSP and a touch IC 20.

The touch screen device with an integrated fingerprint sensor according to the present disclosure may be implemented as a capacitive touch screen TSP that detects a touch input by a plurality of capacitive sensors.

The capacitive touch screen comprises a plurality of sensors that have capacitance. There are two types of capacitance: self-capacitance and mutual capacitance. Self-capacitance may be formed along a single layer of conductor lines formed in one direction. Mutual capacitance may be formed between two perpendicular conductor lines intersecting each other.

The touch screen TSP implemented with mutual capacitance sensors may comprise Tx electrodes (or Tx channels) arranged side by side in a first direction, Rx electrodes (or Rx channels) arranged side by side in a second direction and intersecting the Tx electrodes, and mutual capacitance sensors formed at the intersections of the Tx electrodes and the Rx electrodes. Each mutual capacitance sensor comprises an insulating layer located between a Tx electrode and an Rx electrode. In mutual capacitive sensing, a sensor driving signal is applied to the TX electrodes of the mutual capacitance sensors through Tx electrode lines to supply an electrical charge to the mutual capacitance sensors, and touch input can be sensed by sensing a change in the capacitance of the mutual capacitance sensors through the RX electrodes and Rx electrode lines, in synchronization with the sensor driving signal. The Tx electrode lines are driving signal lines that apply a sensor driving signal to each sensor to supply an electrical charge to the sensors. The Rx electrode lines are sensor lines that are connected to the sensors to supply the electrical charge in the sensors to the touch IC 20.

The touch screen TSP may be bonded onto an upper polarizer on a display panel DIS, or may be formed between the upper polarizer on the display panel DIS and an upper substrate. In addition, the sensors of the touch screen TSP may be embedded in a pixel array of the display panel DIS.

The touch screen TSP may have a fingerprint recognition area FAR with a first surface area and a touch recognition area TAR with a second surface area which is wider than the first surface area. Although the exemplary aspect below will be described with respect to a single fingerprint recognition area FAR, it is needless to say that this is merely for illustration and the present disclosure is not limited thereto. Moreover, although the exemplary aspect below will be described with an example in which the fingerprint recognition area FAR is located in the bottom center of the touch screen TSP, it should be noted that the fingerprint recognition area FAR is not limited to specific positions and may be placed anywhere on the touch screen TSP. The fingerprint recognition area FAR and touch recognition area TAR on the touch screen TSP overlap an image display area on the display panel DIS.

To implement a touch screen with an integrated fingerprint sensor, the Tx electrodes and the Rx electrodes are formed in a micropattern, i.e., high-density electrode pattern, in the fingerprint recognition area FAR on the touch screen TSP and the areas to the left and right of the fingerprint recognition area FAR. With the Tx electrodes and Rx electrodes formed in the high-density electrode pattern in the fingerprint recognition area FAR, fingerprint sensors are made thin enough so that many of them fit between fingerprint ridges and valleys, thereby enabling accurate fingerprint sensing.

The areas to the left and right of the fingerprint recognition area FAR may become dead zones where fingerprint recognition and touch recognition are not available, or may be used as the touch recognition area. When the areas to the left and right of the fingerprint recognition area FAR are used as the touch recognition area, the Tx electrodes formed in the high-density electrode pattern may be grouped together in numbers, and the Tx electrodes in the same group may be driven simultaneously. The reason why the Tx electrodes are grouped together and driven simultaneously is to reduce power consumption and touch report rate since touch sensors do not require as high resolution as fingerprint sensors.

In the touch recognition area TAR, the Tx electrodes and the Rx electrodes are formed in a low-density electrode pattern. In the areas to the left and right of the fingerprint recognition area FAR, the Rx electrodes are formed in a low-density electrode pattern.

In the touch screen with an integrated fingerprint sensor, the touch sensors and the fingerprint sensors are physically separated so that the touch recognition feature can be used during fingerprint recognition operation. The fingerprint sensors are formed in a high-density electrode pattern in the fingerprint recognition area FAR, and the touch sensors are formed in a low-density electrode pattern in the touch recognition area TAR. In the fingerprint recognition area FAR, fingerprint recognition is available but touch recognition is not available. In the touch recognition area TAR, touch recognition is available but fingerprint recognition is not available.

A ground pattern is inserted between the fingerprint recognition area FAR and the touch recognition area TAR in order to minimize signal interference.

The touch IC 20 comprises a first driving signal supply part that supplies a sensor driving signal to the Tx electrodes in the fingerprint recognition area FAR and a second driving signal supply part that supplies a sensor driving signal to the Tx electrodes in the touch recognition area TAR. The touch IC 20 comprises a first sensing part that obtains fingerprint recognition information by sensing the Rx electrodes in the fingerprint recognition area FAR and a second sensing part that obtains touch recognition information by sensing the Rx electrodes in the touch recognition area TAR.

The touch IC 20 sends touch coordinate data TDATA and fingerprint recognition data FDATA obtained by sensing to a host system 18.

Meanwhile, the display device to which the touch screen device with an integrated fingerprint sensor according to the present disclosure may comprise the display panel DIS, display drive circuits 12, 14, and 16, and the host system 18.

The display panel DIS comprises a liquid crystal layer formed between two substrates. The pixel array on the display panel DIS comprises pixels formed in pixel regions defined by data lines D1 to Dm (m is a positive integer) and gate lines G1 to Gn (n is a positive integer). Each pixel may comprise a TFT (thin film transistor) formed at the intersection of a data line D1 to Dm and a gate line G1 to Gn, a pixel electrode that is charged with a data voltage, and a storage capacitor Cst connected to the pixel electrode to hold the voltage of a liquid crystal cell.

A black matrix, color filters, etc. may be formed on the upper substrate of the display panel DIS. A lower substrate of the display panel DIS may be implemented in a COT (color filter on TFT) structure. In this case, the black matrix and the color filters may be formed on the lower substrate of the display panel DIS. A common electrode to be supplied with a common voltage may be formed on the upper or lower substrate of the display panel DIS. Polarizers are respectively attached to the upper and lower substrates of the display panel DIS, and an alignment film for setting a pre-tilt angle of liquid crystals is formed on an inner surface contacting the liquid crystals. A column spacer is formed between the upper and lower substrates of the display panel DIS to maintain a cell gap for liquid crystal cells.

A backlight unit may be disposed on the back of the display panel DIS. The backlight unit may be implemented as an edge-type or direct-type backlight unit which illuminates the display panel DIS. The display panel DIS may be implemented in any liquid crystal mode, such as a TN (Twisted Nematic) mode, a VA (Vertical Alignment) mode, an IPS (In-Plane Switching) mode, and an FFS (Fringe Field Switching) mode.

The display drive circuits comprise a data drive circuit 12, a scan drive circuit 14, and a timing controller 16, and write video data of an input image to the pixels on the display panel DIS. The data drive circuit 12 converts digital video data RGB input from the timing controller 16 to analog positive/negative gamma compensated voltages to output data voltages. The data voltages output from the data drive circuit 12 are supplied to the data lines D1 to Dm. The scan drive circuit 14 sequentially supplies gate pulses (or scan pulses) synchronized with data voltages to the gate lines G1 to Gn to select pixel lines from the display panel DIS to write the data voltages to the pixels.

The timing controller 16 receives timing signals, such as a vertical synchronization signal Vsync, a horizontal synchronization signal Hsync, a data enable signal DE, a main clock MCLK, etc., an input from the host system 18, and synchronizes the operation timings of the data drive circuit 12 and scan drive circuit 14. A scan timing control signal comprises a gate start pulse GSP, a gate shift clock, a gate output enable signal GOE, etc. A data timing control signal comprises a source sampling clock SSC, a polarity control signal POL, a source output enable signal SOE, etc.

The host system 18 may be implemented as one of the following: a television system, a set-top box, a navigation system, a DVD player, a Blu-ray player, a personal computer PC, a home theater system, and a phone system. The host system 18 comprises a system-on-chip (SoC) having a scaler incorporated in it, and converts digital video data RGB of an input image into a format suitable for display on the display panel DIS. The host system 18 transmits the timing signals Vsync, Hsync, DE, and MCLK, along with the digital video data, to the timing controller 16. Moreover, the host system 18 executes an application associated with a touch report input from the touch IC 20.

Figure 4:
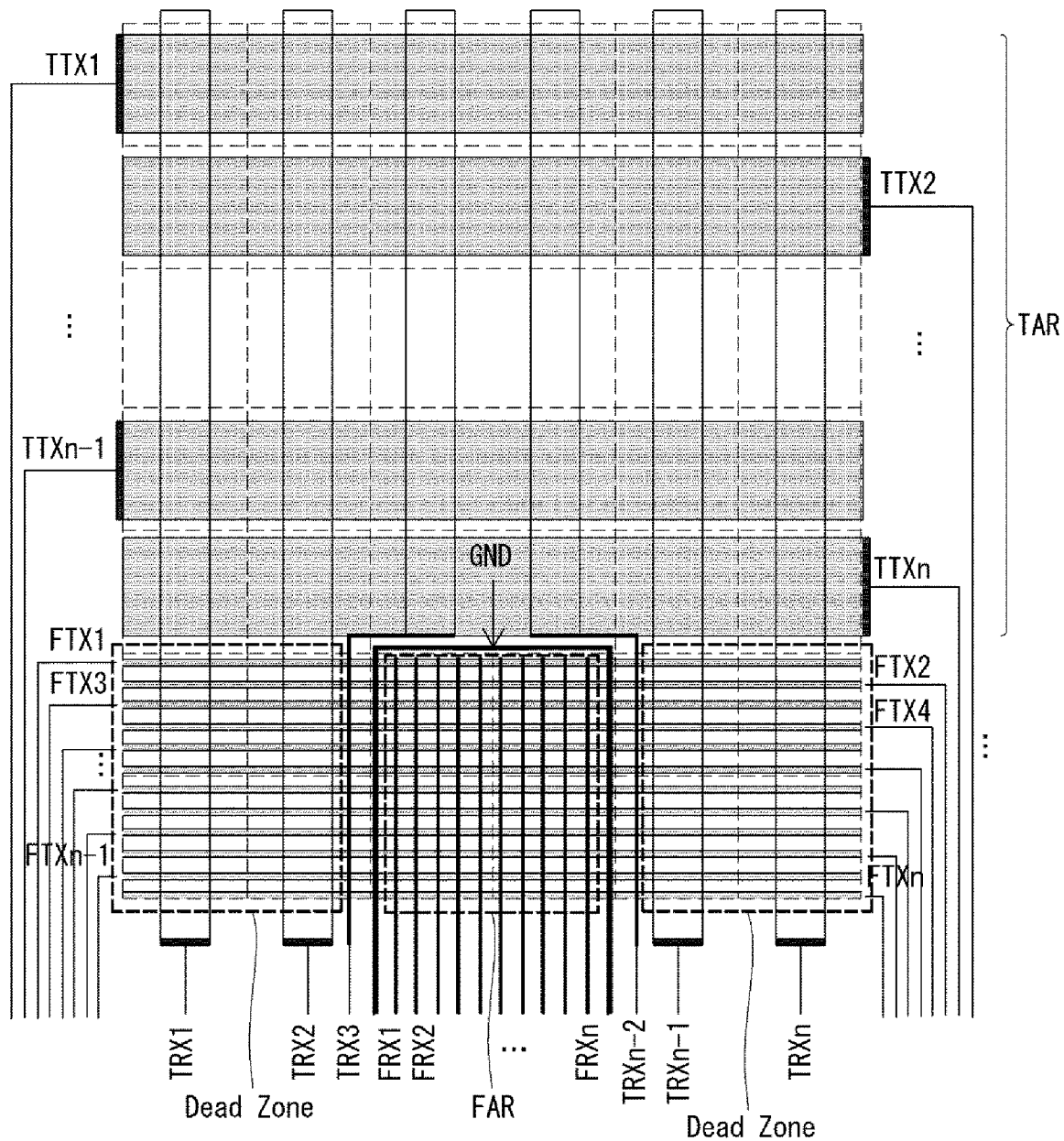
FIG. 4 is a view showing a touch screen device with an integrated fingerprint sensor according to an aspect of the present disclosure.

FIG. 4 is a view showing a touch screen device with an integrated fingerprint sensor according to an aspect of the present disclosure.

Referring to FIG. 4, the touch screen TSP comprises a fingerprint recognition area FAR capable of performing fingerprint recognition, a touch recognition area TAR capable of performing touch recognition, and dead zones placed to the left and right sides of the fingerprint recognition area FAR.

The fingerprint recognition area FAR comprises a first group of Tx electrodes FTX1 to FTXn arranged side by side in a first direction, a first group of Rx electrodes FRX1 to FRXn arranged side by side in a second direction and intersecting the first group of Tx electrodes FTX1 to FTXn, and fingerprint sensors formed at the intersections of the first group of Tx electrodes FTX1 to FTXn and the first group of Rx electrodes FRX1 to FRXn. The first group of Tx electrodes FTX1 to FTXn and the first group of Rx electrodes FRX1 to FRXn are implemented in a high-density electrode pattern.

The first group of Tx electrodes FTX1 to FTXn are connected to the touch IC 20 via first routing lines. The first routing lines may be placed on two sides of the first group of Tx electrodes FTX1 to FTXn so as to make it easy to create space between the routing lines. The first routing lines comprise first left routing lines connected to the left side of the first group of Tx electrodes FTX1 to FTXn and first right routing lines connected to the right side of the first group of Tx electrodes FTX1 to FTXn. Out of the first group of Tx electrodes FTX1 to FTXn, the odd-numbered Tx electrodes FTX1, FTX3, . . . , FTXn−1 may be connected to the touch IC 20 via the first left routing lines, and the even-numbered Tx electrodes FTX2, FTX4, . . . , FTXn may be connected to the touch IC 20 via the first right routing lines.

The touch recognition area TAR comprises a second group of Tx electrodes TTX1 to TTXn arranged side by side in a first direction, a second group of Rx electrodes TRX1 to TRXn arranged side by side in a second direction and intersecting the second group of Tx electrodes TTX1 to TTXn, and touch sensors formed at the intersections of the second group of Tx electrodes TTX1 to TTXn and the second group of Rx electrodes TRX1 to TRXn. The second group of Tx electrodes TTX1 to TTXn and the second group of Rx electrodes TRX1 to TRXn are implemented in a low-density electrode pattern.

The second group of Tx electrodes TTX1 to TTXn are connected to the touch IC 20 via second routing lines. The second routing lines may be placed on two sides of the second group of Tx electrodes TTX1 to TTXn so as to make it easy to create space between the routing lines. The second routing lines comprise second left routing lines connected to the left side of the second group of Tx electrodes TTX1 to TTXn and second right routing lines connected to the right side of the second group of Tx electrodes TTX1 to TTXn. Out of the second group of Tx electrodes TTX1 to TTXn, the odd-numbered Tx electrodes TTX1 and TTXn−1 may be connected to the touch IC 20 via the second left routing lines, and the even-numbered Tx electrodes TTX2 and TTXn may be connected to the touch IC 20 via the second right routing lines.

The first group of Tx electrodes FTX1 to FTXn and the second group of Rx electrodes TRX1 to TRXn intersect in the dead zones placed on the left and right sides of the fingerprint recognition area FAR. Fingerprint sensing and touch sensing are not available in the dead zones.

A ground pattern GND is inserted between the fingerprint recognition area FAR and the touch recognition area TAR in order to minimize signal interference.

Figure 5:
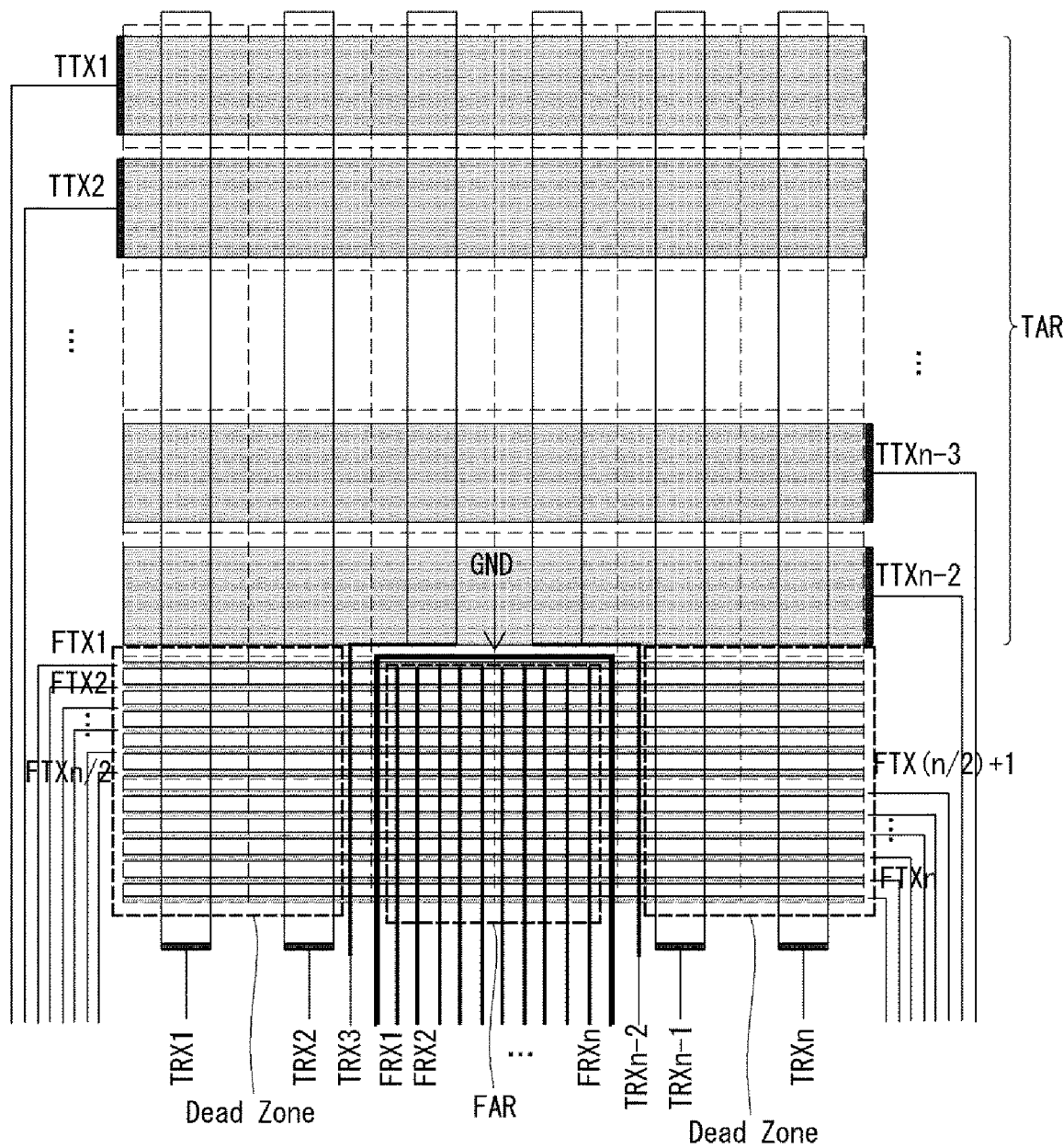
FIG. 5 is a view showing a touch screen device with an integrated fingerprint sensor according to another aspect of the present disclosure.

FIG. 5 is a view showing a touch screen device with an integrated fingerprint sensor according to another aspect of the present disclosure.

FIG. 5 is similar to what has been illustrated in FIG. 4, except that the routing lines have a different configuration structure from those of FIG. 4. Descriptions of the same elements will be omitted.

Referring to FIG. 5, the first group of Tx electrodes FTX1 to FTXn are connected to the touch IC 20 via first routing lines. The first routing lines may be placed on two sides of the first group of Tx electrodes FTX1 to FTXn so as to make it easy to create space between the routing lines. The first routing lines comprise first left routing lines connected to the left side of the first group of Tx electrodes FTX1 to FTXn and first right routing lines connected to the right side of the first group of Tx electrodes FTX1 to FTXn. Out of the first group of Tx electrodes FTX1 to FTXn, the odd-numbered set of Tx electrodes FTX1, FTX2, . . . , FTXn/2 may be connected to the touch IC 20 via the first left routing lines, and the even-numbered set of Tx electrodes FTX(n/2)+1, FTX(n/2)+2, . . . , FTXn may be connected to the touch IC 20 via the first right routing lines.

The second group of Tx electrodes TTX1 to TTXn are connected to the touch IC 20 via second routing lines. The second routing lines may be placed on two sides of the second group of Tx electrodes TTX1 to TTXn so as to make it easy to create space between the routing lines. The second routing lines comprise second left routing lines connected to the left side of the second group of Tx electrodes TTX1 to TTXn and second right routing lines connected to the right side of the second group of Tx electrodes TTX1 to TTXn. Out of the second group of Tx electrodes TTX1 to TTXn, the odd-numbered pair of Tx electrodes TTX1 and TTX2 may be connected to the touch IC 20 via the second left routing lines, and the even-numbered pair of Tx electrodes TTXn−3 and TTXn−2 may be connected to the touch IC 20 via the second right routing lines.

Figure 6:
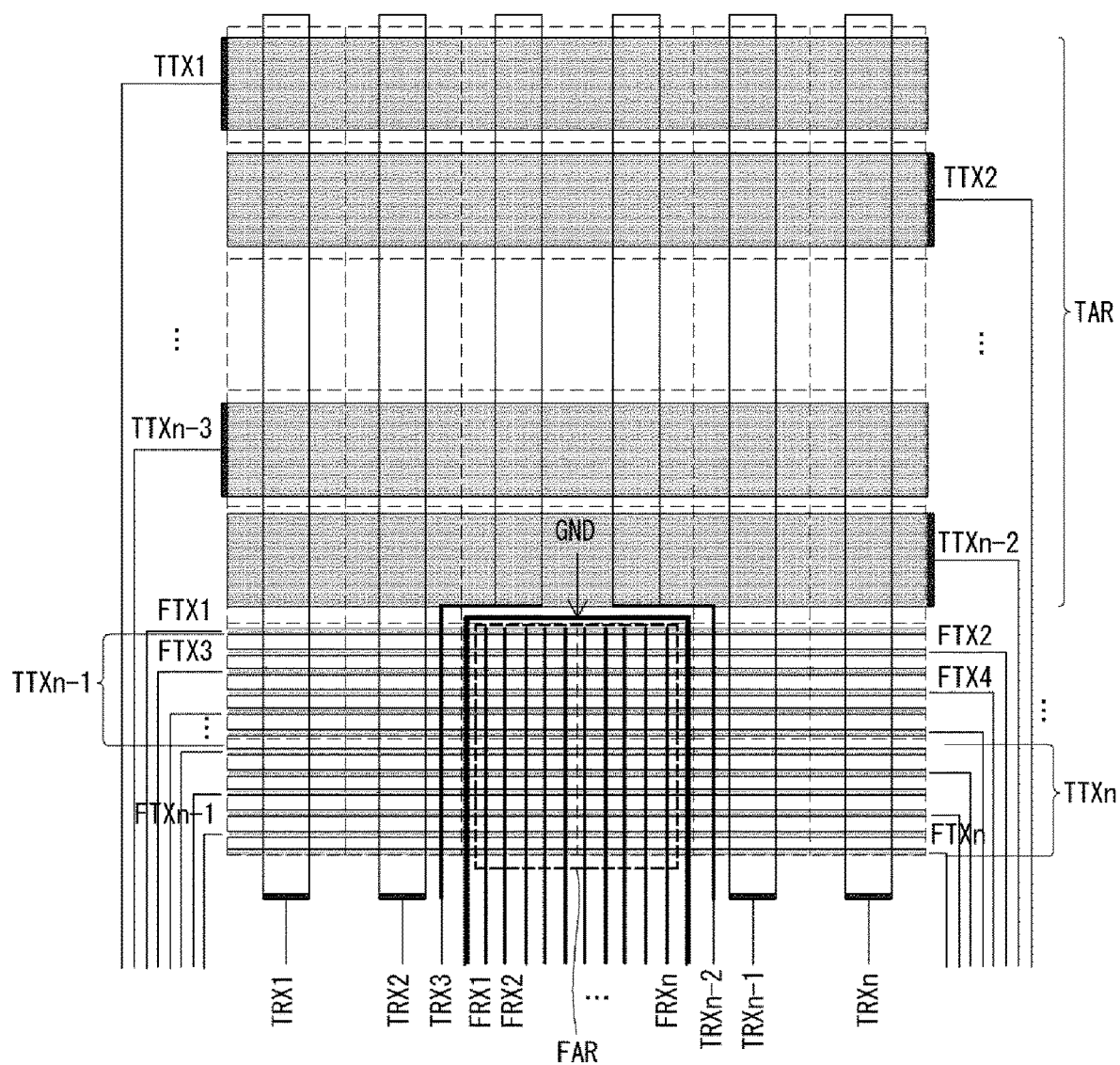
FIG. 6 is a view showing a touch screen device with an integrated fingerprint sensor according to yet another aspect of the present disclosure.

FIG. 6 is a view showing a touch screen device with an integrated fingerprint sensor according to yet another aspect of the present disclosure.

FIG. 6 is substantially similar to what has been illustrated in FIG. 4, except that the areas to the left and right of the fingerprint recognition area are used as the touch recognition area and the routing lines have a different configuration structure from those of FIG. 4. Descriptions of the same elements will be omitted.

Referring to FIG. 6, in order for the touch IC to use the areas to the left and right of the fingerprint recognition area FAR as the touch recognition area TAR, the Tx electrodes formed in the high-density pattern in the areas to the left and right of the fingerprint recognition area FAR may be grouped together in numbers (n/2), and the Tx electrodes TTXn−1 and TTXn in the same group may be driven simultaneously.

The second group of Tx electrodes TTX1 to TTXn are connected to the touch IC 20 via second routing lines. The second routing lines may be placed on two sides of the second group of Tx electrodes TTX1 to TTXn so as to make it easy to create space between the routing lines. The second routing lines comprise second left routing lines connected to the left side of the second group of Tx electrodes TTX1 to TTXn and second right routing lines connected to the right side of the second group of Tx electrodes TTX1 to TTXn. Out of the second group of Tx electrodes TTX1 to TTXn, the odd-numbered Tx electrodes TTX1 and TTXn−1 may be connected to the touch IC 20 via the second left routing lines, and the even-numbered Tx electrodes TTX2 and TTXn−2 may be connected to the touch IC 20 via the second right routing lines.

The first group of Tx electrodes FTX1 to FTXn and the second group of Rx electrodes TRX1 to TRXn intersect in the areas to the left and right of the fingerprint recognition area FAR. In order to use the areas to the left and right of the fingerprint recognition area FAR as the touch recognition area TAR, the first group of Tx electrodes FTX1 to FTXn may be grouped together in numbers (n/2) and may serve as some of the second group of Tx electrodes TTXn−1 and TTXn.

Figure 7:
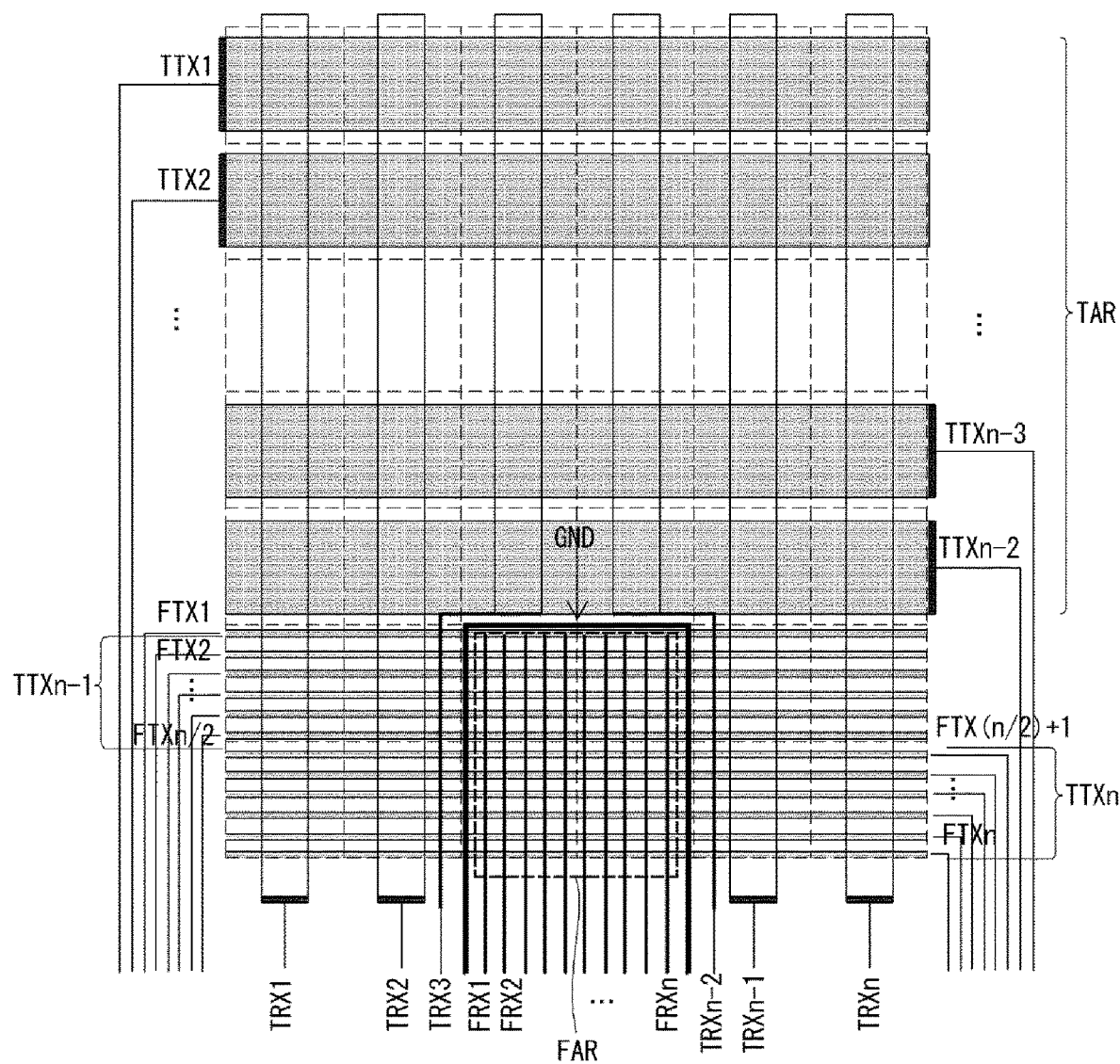
FIG. 7 is a view showing a touch screen device with an integrated fingerprint sensor according to still another aspect of the present disclosure.

FIG. 7 is a view showing a touch screen device with an integrated fingerprint sensor according to still another aspect of the present disclosure.

FIG. 7 is similar to what has been illustrated in FIG. 6, except that the routing lines have a different configuration structure from those of FIG. 6. Descriptions of the same elements will be omitted.

Referring to FIG. 7, the first group of Tx electrodes FTX1 to FTXn are connected to the touch IC 20 via first routing lines. The first routing lines may be placed on two sides of the first group of Tx electrodes FTX1 to FTXn so as to make it easy to create space between the routing lines. The first routing lines comprise first left routing lines connected to the left side of the first group of Tx electrodes FTX1 to FTXn and first right routing lines connected to the right side of the first group of Tx electrodes FTX1 to FTXn. Out of the first group of Tx electrodes FTX1 to FTXn, the odd-numbered set of Tx electrodes FTX1, FTX2, . . . , FTXn/2 may be connected to the touch IC 20 via the first left routing lines, and the even-numbered set of Tx electrodes FTX(n/2)+1, FTX(n/2)+2, . . . , FTXn may be connected to the touch IC 20 via the first right routing lines.

The second group of Tx electrodes TTX1 to TTXn are connected to the touch IC 20 via second routing lines. The second routing lines may be placed on two sides of the second group of Tx electrodes TTX1 to TTXn so as to make it easy to create space between the routing lines. The second routing lines comprise second left routing lines connected to the left sides of the second group of Tx electrodes TTX1 to TTXn and second right routing lines connected to the right side of the second group of Tx electrodes TTX1 to TTXn. Out of the second group of Tx electrodes TTX1 to TTXn, the odd-numbered pair of Tx electrodes TTX1 and TTX2 may be connected to the touch IC 20 via the second left routing lines, and the even-numbered pair of Tx electrodes TTXn−3 and TTXn−2 may be connected to the touch IC 20 via the second right routing lines.

Figure 8:
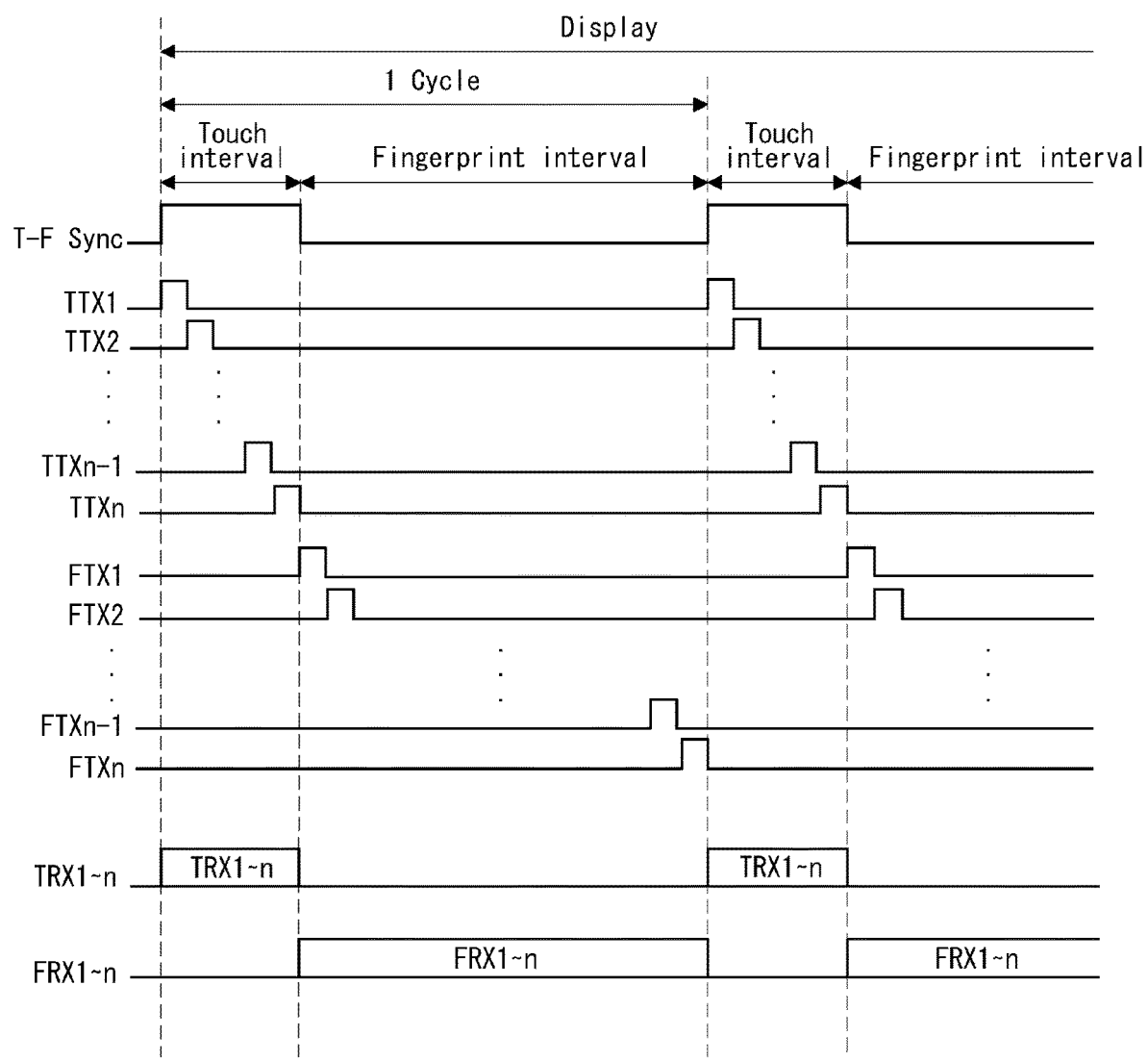
FIG. 8 is a timing diagram of how touch sensors and fingerprint sensors are driven in a time-division manner in a fingerprint sensing mode.

FIG. 8 is a timing diagram of how touch sensors and fingerprint sensors are driven in a time-division manner in a fingerprint sensing mode.

Referring to FIG. 8, in a fingerprint sensing mode, the touch IC 20 allows touch operation in areas other than the fingerprint recognition area FAR within the touch screen TSP, even while in the fingerprint sensing mode, by allocating touch intervals for driving the touch sensors to perform sensing and fingerprint intervals for driving the fingerprint sensors to perform sensing, within one cycle of a touch-fingerprint synchronization signal T-F Sync.

In the fingerprint sensing mode, during the touch intervals, the touch IC 20 sequentially supplies a sensor driving signal to the Tx electrodes TTX1 to TTXn in the touch recognition area TAR and senses touch recognition information from the Rx electrodes TRX1 to TRXn in the touch recognition area TAR. In the fingerprint sensing mode, during the fingerprint intervals, the touch IC 20 supplies a sensor driving signal to the Tx electrodes FTX1 to FTXn in the fingerprint recognition area FAR and senses touch recognition information from the Rx electrodes FRX1 to FRXn in the fingerprint recognition area FAR.

Meanwhile, in the fingerprint sensing mode, the period in which the touch sensors and the fingerprint sensors are driven to perform sensing may overlap a display period for displaying an image on the display panel DIS.

Figure 9:
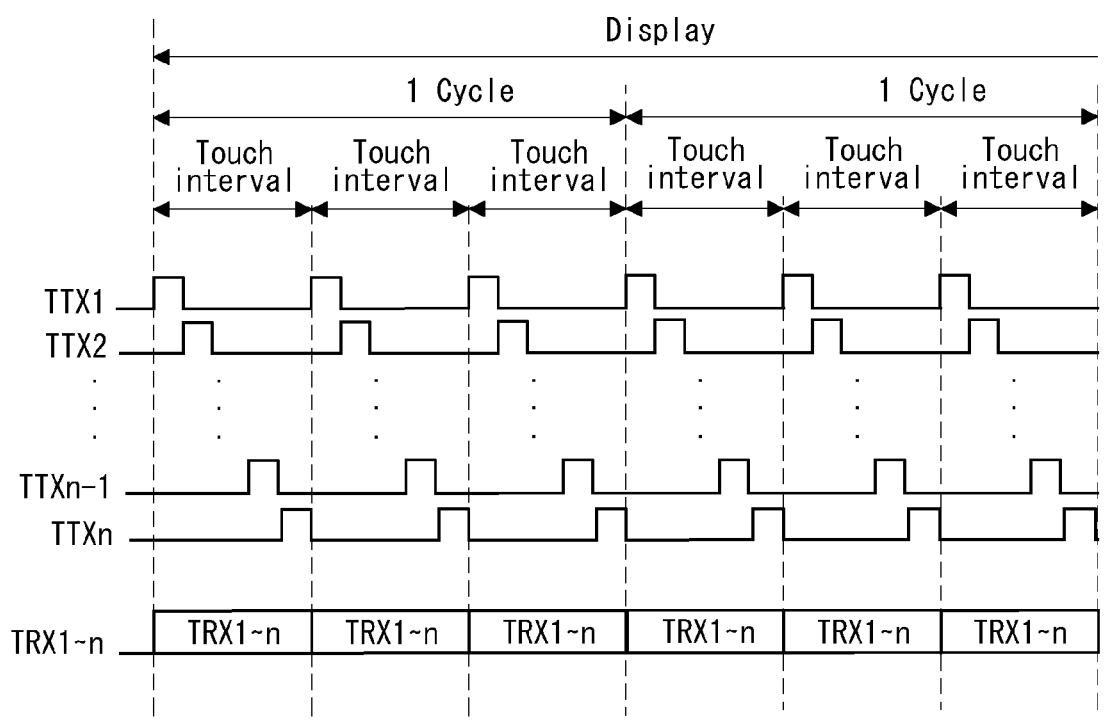
FIG. 9 is a timing diagram of how touch sensors are driven repetitively in a touch sensing mode.

FIG. 9 is a timing diagram of how touch sensors are driven repetitively in a touch sensing mode.

Referring to FIG. 9, in a touch sensing mode, the touch IC 20 repetitively drives only the touch sensors in the touch recognition area TAR to perform sensing several times within one cycle, but not the fingerprint sensors in the fingerprint recognition area FAR. In other words, in the touch sensing mode, the touch IC 20 sequentially supplies a sensor driving signal only to the Tx electrodes TTX1 to TTXn in the touch recognition area TAR and senses touch recognition information from the Rx electrodes TRX1 to TRXn in the touch recognition area TAR.

Meanwhile, in the touch sensing mode, the period in which the touch sensors are driven to perform sensing may overlap a display period for displaying an image on the display panel DIS.

Figure 10A:
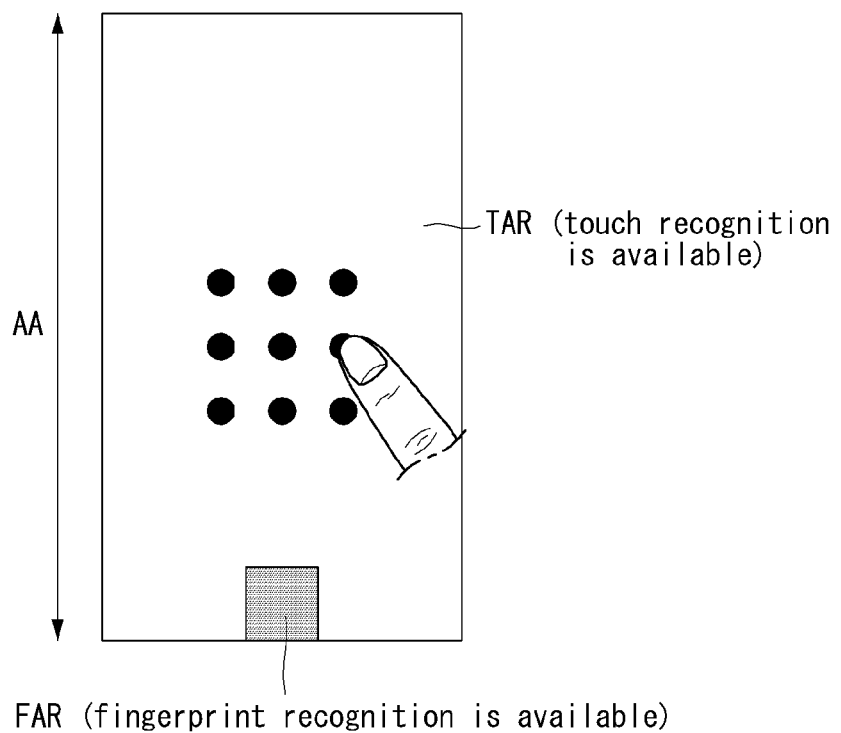
FIGS. 10A and 10B are views showing examples in which, in fingerprint sensing mode, a touch operation is available in areas other than the fingerprint sensing area within the touch screen.
Figure 10B:
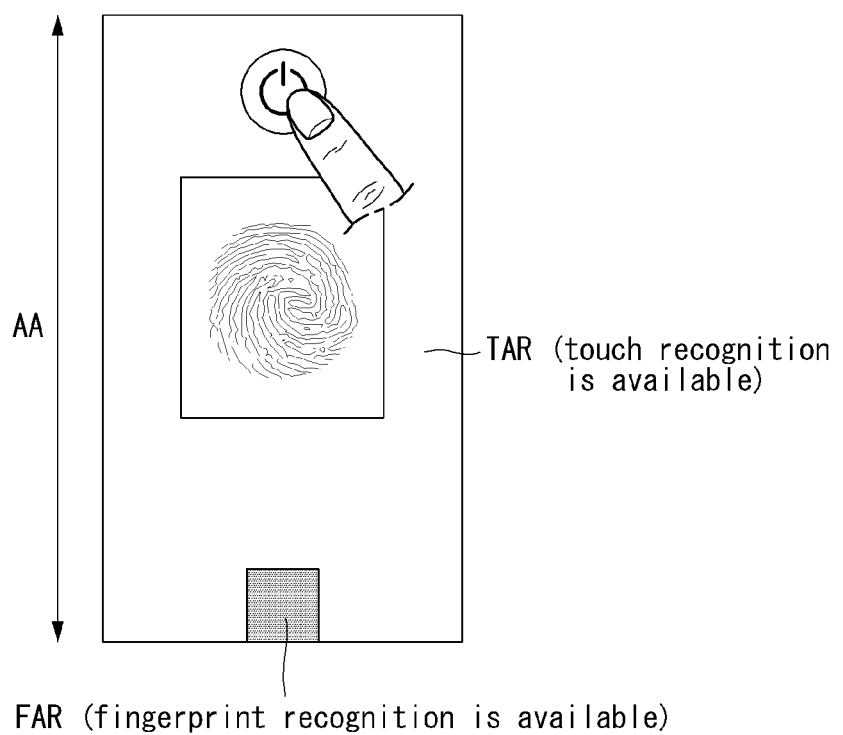

FIGS. 10A and 10B are views showing examples in which, in the fingerprint sensing mode, a touch operation is available in areas other than the fingerprint recognition area within the touch screen.

Referring to FIGS. 10A and 10B, the capacitive touch screen with integrated fingerprint sensor according to the present disclosure may provide a wide range of conveniences in terms of products since the touch recognition area can be driven simultaneously with the fingerprint recognition area in fingerprint sensing mode.

For example, as shown in FIG. 10A, the capacitive touch screen with integrated fingerprint sensor according to the present disclosure allows the user to choose a password, pattern, or fingerprint to initially unlock the lock screen. In this case, the fingerprint sensors and the touch sensors can be driven simultaneously.

Moreover, as shown in FIG. 10B, in the capacitive touch screen with integrated fingerprint sensor according to the present disclosure, the user may perform touch operation even while the fingerprint recognition feature is in operation, so as to stop fingerprint recognition and switch to another screen during fingerprint recognition operation (such as while registering the user's fingerprint).

As described above, the capacitive touch screen with integrated fingerprint sensor according to the present disclosure may provide a wide range of conveniences in terms of products since the touch recognition area can be driven simultaneously with the fingerprint recognition area in fingerprint sensing mode.

From the above-described details, those skilled in the art will appreciate that various modifications are possible without departing from the technical spirit of the disclosure. Accordingly, the scope of the disclosure must not be limited to only details of the above-described aspect, but defined by the claims.

What is claimed is:

1. A touch screen device with an integrated fingerprint sensor, comprising:
   a touch screen having a fingerprint recognition area with fingerprint sensors and a touch recognition area with touch sensors separated from the fingerprint sensors; and
   a touch IC configured to drive both the touch sensors and the fingerprint sensors in a fingerprint sensing mode to sense fingerprint recognition information from the fingerprint sensors and touch recognition information from the touch sensors,
   wherein the touch recognition area has a plurality of Tx electrodes arranged side by side in a first direction and a plurality of Rx electrodes arranged side by side in a second direction and intersecting the Tx electrodes, and the fingerprint recognition area is disposed between first and second zones where a first group of the Tx electrodes having a first density pattern and a second group of the Rx electrodes having a second density pattern intersect with each other, and the first density pattern has a higher density than the second density pattern, and
   wherein the first and second zones function as a dead zone where the fingerprint and the touch are not sensed or the touch recognition area where the touch recognition information is sensed only, and
   wherein the first group of the Tx electrodes is extended to the fingerprint recognition area and the second group of the Rx electrodes is extended to the touch recognition area.

2. The touch screen device of claim 1, wherein, in the fingerprint sensing mode, the touch IC allocates touch intervals for driving the touch sensors to perform sensing and fingerprint intervals for driving the fingerprint sensors to perform sensing, within one cycle of a touch-fingerprint synchronization signal.

3. The touch screen device of claim 2, wherein the touch IC supplies a sensor driving signal to the Tx electrodes in the touch recognition area and senses touch recognition information from the Rx electrodes in the touch recognition area during the touch intervals, and the touch IC supplies a sensor driving signal to the Tx electrodes in the fingerprint recognition area and senses touch recognition information from the Rx electrodes in the fingerprint recognition area during the fingerprint intervals.

4. The touch screen device of claim 3, wherein the Tx electrodes are formed of the first density pattern and disposed in the fingerprint recognition area and the first and second zones adjacent to the fingerprint recognition area, and the Tx electrodes formed of the the first density pattern in the areas to the first and second zones adjacent to the fingerprint recognition area are grouped together in a plurality of numbers, and the Tx electrodes in the same group are driven simultaneously, in order for the touch IC to use the first and second zones adjacent to the fingerprint recognition area as the touch recognition area.

5. The touch screen device of claim 1, wherein, in a touch sensing mode, the touch IC repetitively drives only the touch sensors in the touch recognition area to perform sensing.

6. The touch screen device of claim 1, further comprising a ground pattern inserted between the fingerprint recognition area and the touch recognition area in order to minimize a signal interference.

7. A method of driving a touch screen device with an integrated fingerprint sensor, the touch screen device comprising a touch screen having a fingerprint recognition area with fingerprint sensors and a touch recognition area with touch sensors separated from the fingerprint sensors,
   wherein both the touch sensors and the fingerprint sensors are configured to be driven in a fingerprint sensing mode to sense fingerprint recognition information from the fingerprint sensors and touch recognition information from the touch sensors, and
   wherein the touch recognition area has a plurality of Tx electrodes arranged side by side in a first direction and a plurality of Rx electrodes arranged side by side in a second direction and intersecting the Tx electrodes, and the fingerprint recognition area is disposed between first and second zones where a first group of the Tx electrodes having a first density pattern and a second group of the Rx electrodes having a second density pattern intersect with each other, and the first density pattern has a higher density than the second density pattern, and
   wherein the first and second zones function as a dead zone where the fingerprint and the touch are not sensed or the touch recognition area where the touch recognition information is sensed only, and
   wherein the first group of the Tx electrodes is extended to the fingerprint recognition area and the second group of the Rx electrodes is extended to the touch recognition area.

8. The method of claim 7, wherein, in the fingerprint sensing mode, touch intervals for driving the touch sensors to perform sensing and fingerprint intervals for driving the fingerprint sensors to perform sensing are allocated within one cycle of a touch-fingerprint synchronization signal.

9. The method of claim 8, wherein a sensor driving signal is supplied to the Tx electrodes in the touch recognition area to sense touch recognition information from the Rx electrodes in the touch recognition area during the touch intervals, and a sensor driving signal is supplied to the Tx electrodes in the fingerprint recognition area to sense touch recognition information from the Rx electrodes in the fingerprint recognition area during the fingerprint intervals.

10. The method of claim 9, wherein, when the Tx electrodes are formed of first density pattern in the fingerprint recognition area and the first and second zones adjacent to the fingerprint recognition area, the Tx electrodes formed in the first density pattern in the left and right areas of the fingerprint recognition area are grouped together in a plurality of numbers, and the Tx electrodes in the same group are simultaneously driven, in order to use the first and second zones adjacent to the fingerprint recognition area as the touch recognition area.

11. The method of claim 7, wherein only the touch sensors in the touch recognition area are driven repetitively to perform sensing in a touch sensing mode.

12. A display device having a display panel displaying an image, comprising:
a touch screen overlapping an image display area on the display panel and having a fingerprint recognition area and a touch recognition area, wherein the fingerprint recognition area has fingerprint sensors and the touch recognition area has touch sensors separated from the fingerprint sensors; and
a touch IC driving the touch sensors and the fingerprint sensors in a time-division manner in a fingerprint sensing mode, so that both the touch sensors and the fingerprint sensors obtain sense fingerprint recognition information from the fingerprint sensors and touch recognition information from the touch sensor in the fingerprint sensing mode,
wherein the touch recognition area has a plurality of Tx electrodes arranged side by side in a first direction and a plurality of Rx electrodes arranged side by side in a second direction and intersecting the Tx electrodes, and the fingerprint recognition area is disposed between first and second zones where a first group of the Tx electrodes having a first density pattern and a second group of the Rx having a second density pattern electrodes intersect with each other, and the first density pattern has a higher density than the second density pattern, and
wherein the first and second zones function as a dead zone where the fingerprint and the touch are not sensed or the touch recognition area where the touch recognition information is sensed only, and
wherein the first group of the Tx electrodes is extended to the fingerprint recognition area and the second group of the Rx electrodes is extended to the touch recognition area.

13. The display device of claim 12, further comprising a ground pattern between the fingerprint recognition area and the touch recognition area to minimize a signal interference.

14. The display device of claim 12, wherein the fingerprint sensors are formed of the first density pattern in the fingerprint recognition area, and the touch sensors are formed of the second density pattern in the touch recognition area.

15. The display device of claim 12, wherein the touch IC allows a touch operation in areas other than the fingerprint recognition area within the touch screen during the fingerprint sensing mode, by allocating touch intervals for driving the touch sensors to perform sensing and fingerprint intervals for driving the fingerprint sensors to perform sensing within one cycle of a touch-fingerprint synchronization signal.

16. The display device of claim 15, wherein the touch IC sequentially supplies a sensor driving signal to the touch recognition area and senses touch recognition information from the touch recognition area in the fingerprint sensing mode, during the touch intervals.

17. The display device of claim 15, wherein the touch IC supplies a sensor driving signal to the fingerprint recognition area and senses touch recognition information from the fingerprint recognition area in the fingerprint sensing mode during the fingerprint intervals.

18. The display device of claim 12, wherein the touch IC repetitively drives the touch sensors in the touch recognition area to perform sensing in a touch sensing mode.

19. The display device of claim 18, wherein the touch IC does not drive the fingerprint sensors in the fingerprint recognition area.

20. The display device of claim 12, wherein the touch sensors and the fingerprint sensors have a sensing period overlapping a display period for displaying the image on the display panel in the fingerprint sensing mode.

* * * * *